(12) United States Patent
Gilman

(10) Patent No.: US 10,453,137 B1
(45) Date of Patent: Oct. 22, 2019

(54) INTERACTING ANONYMOUSLY IN A NETWORK MARKET

(71) Applicant: Sean Gilman, Rye, NY (US)

(72) Inventor: Sean Gilman, Rye, NY (US)

( * ) Notice: Subject to any disclaimer, the term of this patent is extended or adjusted under 35 U.S.C. 154(b) by 484 days.

(21) Appl. No.: 15/380,517

(22) Filed: Dec. 15, 2016

Related U.S. Application Data

(60) Provisional application No. 62/267,733, filed on Dec. 15, 2015.

(51) Int. Cl.
*G06Q 40/04* (2012.01)
*H04L 29/06* (2006.01)
*H04L 29/08* (2006.01)

(52) U.S. Cl.
CPC ......... *G06Q 40/04* (2013.01); *H04L 63/0421* (2013.01); *H04L 67/12* (2013.01)

(58) Field of Classification Search
CPC .................................................... G06Q 40/04
USPC ....................................................... 705/3–44
See application file for complete search history.

(56) References Cited

U.S. PATENT DOCUMENTS

| | | | | |
|---|---|---|---|---|
| 7,046,248 B1 * | 5/2006 | Perttunen | .............. | G06F 3/0481 345/440 |
| 7,937,306 B2 * | 5/2011 | Neyman | ................. | G06Q 40/04 705/35 |
| 8,090,645 B1 * | 1/2012 | Silverman | .............. | G06Q 40/00 705/35 |
| 2001/0037284 A1 * | 11/2001 | Finkelstein | ............ | G06Q 40/04 705/37 |
| 2002/0107781 A1 * | 8/2002 | Neyman | ............ | G06Q 30/0615 705/37 |
| 2007/0043651 A1 * | 2/2007 | Xiao | ....................... | G06Q 30/08 705/37 |
| 2009/0018968 A1 * | 1/2009 | Ardell | ..................... | G06Q 40/04 705/36 R |
| 2013/0191267 A1 * | 7/2013 | Rooney | .............. | G06Q 30/0601 705/37 |
| 2014/0032267 A1 * | 1/2014 | Smith | ..................... | G06Q 10/00 705/7.29 |

(Continued)

*Primary Examiner* — Frantzy Poinvil
(74) *Attorney, Agent, or Firm* — Davidson Berquist Jackson & Gowdey, LLP

(57) ABSTRACT

An anonymous and selective networked trading market utilizing a match masking application is described. Clients maintain anonymity through the use of a unique client identifier or an anonymous client identifier. The networked market system allows both selective trading and anonymity through the use of client-created match masks, which provide the trader the ability to select trading partners and tailor each trade to a variety of client-specified requirements. Encoding of match masks and matching of match masks is described. The system further allows clients to adjust future trading parameters based on analysis of previous market activity, which creates a level playing field for all traders. The system allows clients to create and adjust their trading orders without third-party intervention on a distribution network, which provides clients the flexibility to trade with only those other traders who meet their specifications. Tailored masks are applied to orders and match masking is used to match buy and sell orders selectively and anonymously. This is particularly useful in a networked trading systems such as currency trading, commodity trading, and the like.

20 Claims, 7 Drawing Sheets

(56) References Cited

U.S. PATENT DOCUMENTS

2015/0073929 A1* 3/2015 Psota .................... G06Q 50/28
705/26.2

* cited by examiner

| | BUY ORDERS | | | | | SELL ORDERS | | | | | |
|---|---|---|---|---|---|---|---|---|---|---|---|
| OTHER FLAGS | ORD ID | CLIENT ID | ORD MASK | AMT | RATE | RATE | AMT | ORD MASK | CLIENT ID | ORD ID | OTHER FLAGS |
| | 401 | 2 | 110110 | 100 | 50 | 50 | 300 | 100010 | 3 | 404 | |
| | 402 | 4 | 101110 | 200 | 49 | 50 | 250 | 101110 | 1 | 405 | |
| | 403 | 5 | 011010 | 300 | 49 | 51 | 100 | 110000 | 2 | 406 | |

*FIG. 4*

INTERACTING ANONYMOUSLY IN A NETWORK MARKET

RELATED APPLICATIONS

This application claims the priority of U.S. Provisional Patent Application No. 62/267,733, filed on Dec. 15, 2015, which is incorporated herein by reference in its entirety.

FIELD OF INVENTION

The invention described herein relates to an anonymous trading system utilizing a match masking application. The invention described herein also relates to customer trading of products on computer networks including electronic communication networks (ECN). More specifically, the invention relates to systems and methods designed to allow market participants to anonymously trade products in a fully transparent marketplace.

BACKGROUND

The trading of products currently takes place over various mechanisms including telephone, email, real-time order/last look matching engines, periodic auction systems, midpoint matching systems, request for quote systems, request for stream systems, instant message chat, etc. Different trading mechanisms are preferred in different asset classes as a function of the liquidity of the product that is traded and the market structure in place.

Typically, markets with very liquid and well defined products (i.e. stocks, futures) use order matching engines. However, in certain liquid markets, other mechanisms achieve equal success. Such is the case in the very liquid foreign exchange market (FX), as well the US Government Bond market. In these two markets, there are actually two very different yet equally successful mechanisms.

For example: in the U.S. Treasury market both BrokerTec and ESpeed are successful with order driven matching engines. These markets are primarily used by Banks and large proprietary market making firms. Of note is that many large participants in the US Treasury market (e.g., large buy side investment firms, corporates, sovereign wealth funds) generally choose not to participate in Brokertec and Espeed. In that same U.S. Treasury market, TradeWeb and Bloomberg Tradebook provide last look Request For quote/Steam (RFS) trading systems that have been very successful in serving the remainder of the market. On these RFS systems, the market-makers are the same banks that participate on BrokerTec and ESpeed. The takers of liquidity are the buy-side firms (e.g., large buy-side investment firms, corporates, sovereign wealth funds, etc.)

In the global foreign exchange market an analogous situation exists. EBS and Reuters (and a few smaller players) operate real-time order matching systems. The customers on these platforms are generally the very same firms that operate as market makers in the US Treasury market (e.g., Banks and proprietary market-making firms). Vendors such as FXA11, Currenex, Hotspot, FastMatch operate order-last look matching engines. The market-makers on these platforms are the same firms that participate in EBS and Reuters. The market-takers of liquidity are active buy-side firms (retail brokers, hedge funds, corporates, etc.).

Professional, high volume market-makers trade with each other and therefore offset risk on BrokerTec/ESpeed (US Treasuries) and EBS/Reuters (FX). Consequently, this is where real-time price discovery occurs. Buy-side firms trade on TradeWeb/Bloomberg (Treasuries), FXA11, Currenex, Hotspot, FastMatch which is where distribution occurs. The fact that smaller, buy-side players do not participate in the core markets does NOT automatically put those participants at a disadvantage. In fact, the prices on the buy-side platforms are almost always superior (i.e., there is a smaller difference between the bid and offer price) to the prices in the core markets. This is true in both FX and US Treasury markets. This is somewhat counter-intuitive. Instinctively, one would assume that the core market should have the best price because wholesale prices are lower than retail prices; therefore, the same should be true in financial markets. However, such an assumption is false.

This differentiation in pricing quality between core and distribution markets is in fact quite rational. Market-making has become an extremely sophisticated and competitive specialization. Core markets are dominated by professional market-makers. Generally, these professional market-makers prefer to reduce risk with customer flow rather than to trade with each other. They will only take another market-maker price as a last resort. This is because they collect spread (the difference between bid and offer price) on customer trades and they pay spread (they sell at a lower price and buy at a higher price) when they take from other market-makers.

Furthermore, the sophisticated firms trade on core markets for good reasons. They may know there is a large client order arriving, or they know that the correlated futures exchange price for a particular bond or FX has changed in price. Trades like these tend to result in almost instant losses for their counter-parties. This is referred to as "toxic" trade flow and is precisely what all market-makers try to avoid. Since all traders can match with each other on these order markets it is difficult to avoid toxic flow. Therefore, these players trade on these core markets because it is the only place they can send this type of flow.

On the distribution ECNs, the market-taker clients tend to have less real-time information. The timing of their trades tends not to be correlated with rapid changes in the market. This allows the market-makers to avoid toxic flow and to collect spread for their trade flow and potentially profit.

Core market matching systems aim to provide a level playing field between all participants. As such there is usually no significant difference in the workflow for market-makers and market-takers. In contrast, the distribution ECN's goal is to provide the best quality of pricing to their customers. To accomplish this, they provide market-makers with specialized workflows. There are several key features that are typically provided:

They provide the market-maker with a unique client identifier number (or the actual customer name in some cases).

They allow market-makers to choose which prices, if any, they want to send to a given client. This allows the market-maker to identify toxic clients and to remove them or provide them with worse pricing.

They provide the market maker with a last look on each trade so that the market-maker can determine if the price is no longer valid.

These features provide significant advantages to the market-maker over the market-taker. While this may seem unfair, market forces come into play to level the playing field. There is usually a great deal of competition between market-makers. Therefore, to win business, market-makers must narrow their bid/offer spreads. This results in a better price available to each market-taker client. The outcome is that clients with unsophisticated execution receive a superior pricing. Firms with more sophisticated execution receive inferior pricing.

One downside of this approach is lack of transparency. In all distribution ECNs, the relationship between market-makers and market-takers is controlled by an individual or individuals at the ECN. This individual can decide who trades with whom, which market-makers are allowed on the platform, how long they can hold a last look, if the same rules apply to all market-makers, etc. Because these controls are opaque and to the participants, this approach is prone to abuse. This is a potential issue for market regulators as well as a barrier to some clients who demand transparency.

There exists a need for greater transparency in the trading of financial products on computer networks. There exists a need for greater rule transparency in ECNs.

There exists a need to allow market participants to enter the trading market with whatever level of anonymity they choose for each and every trade.

There exists a need for a system and method which provides a market workflow with full transparency and a level playing field which allows market-taker clients to benefit from improved bid/offer spreads via directed pricing in an anonymous environment.

There exists a need for a transparent marketplace which eliminates human intervention at the ECN distribution level. There exists the need for a system that allows traders to analyze the trading market, and have the ability, either anonymously or not, to select which market participants they are willing to trade with. Such a market system would allow both market-makers and market-takers to directly determine their trading counter-parties and not rely on the abuse-prone determination by individuals at the ECN.

There also exists a need for a system and method that supports this fully anonymous trading, thus allowing the consolidation of the "Core Markets" (where price discovery happens) and the "ECN Distribution" markets (where distribution occurs). By consolidating price discovery and distribution, and by providing full transparency of the trading rules, greater efficiencies can be captured and customers can be sure they are being treated fairly.

SUMMARY OF THE INVENTION

The invention relates to systems and methods designed to allow a client to anonymously trade products in a fully transparent marketplace, wherein the invention allows a client to include participant specified criteria within trading order messages, or in conjunction therewith, that allow the market participants to determine whether they are market-makers or market-takers and determine their own trading counter-parties, thereby eliminating the current need for human intervention at the Electronic Communication Network ("ECN") distribution level.

The systems and methods of the present invention incorporate and provide many improvements on existing systems and methods for offering and trading products on computer networks. Furthermore, the invention enables the client to select the level of anonymity they desire to use within the trading market, whereby market participants can trade on a level playing field and benefit from improved bid/offer spread via directed pricing in an anonymous environment, amongst other efficiencies.

In another embodiment, the client can create trading profiles that allow the client to choose which market participants they want to trade with, and identify those market participants by using a match mask which ensures only client approved traders are able to trade with the client. In an alternative embodiment, market participants can create customized match mask messages which specify different client segments, e.g., preferred traders vs. non-preferred traders.

The invention consists of systems and methods for providing a market workflow with full transparency wherein market participants interact with the customer trading system using a unique client identifier to submit trading order messages and associated match mask messages which in combination allow market participants to: trade on a level playing field; analyze client flow and market-maker performance in real-time; and send differentiated pricing to client segments by using multiple last look orders. For example, market-makers can send differentiated pricing to certain market segments by simply submitting multiple trading order messages containing last look indicators with different match masks, which would allow the market-makers to make their pricing as client specific as required/desired.

One embodiment is a network market system that allows clients to choose to remain anonymous through the use of match masks. The system is comprised of a computer network and at least two client devices, operably connected to the computer network, having a processor, a memory, and graphic user interface. The system is configured to create a unique client identifier either selected by the client, or randomly generated by the system, as the client specifies. The computer network receives market data messages from one or more market participants and renders, for use in a display, said market data messages from one or more market participants.

Another embodiment of the system is one in which messages (orders, cancels, etc. . . . ) are held for either a predetermined or a random amount to time by the system before being forwarded to the matching engine. The messages are held or delayed by a server such as the order gateway. This process of deliberately slowing the trading system is intended reduce the advantage of some clients that may benefit from faster technology.

Another embodiment of the system is one in which orders are matched at a midpoint, such midpoint being determined externally. In this embodiment, order matching may happen in real-time or on per-determined intervals. Orders may also contain a worst price that the participant is willing to match. Orders may be matched at better prices (lower for buyer or higher for seller) then the worst price provided in the order. In such an embodiment, there is typically no market data feed provided.

The system is configured to send trading order messages that are created by the client and associate said trading order with said client using the unique client identifier. The system further provides the client an option to apply a match mask filter to said trading order message, wherein the match mask allows the client to choose which market participants he is willing to trade with. Clients may generate and store masks to use in the match masking process. The system applies the match mask to said trading order messages when the client selects that option, and further provides the client an option to apply a last look indicator to said trading order messages When the system matches a trading order, it generates trade match messages, and creates an alert message for the client that approval to execute a trade is required if the trading order message contains a last look indicator, which provides the client the option to approve or disapprove the trade. The system is further configured to send a trade execution message or a trade cancellation message, receive a trade confirmation message or a trade failed message, and render, for use in a display, said trade confirmation message or trade failed message.

One or more data storage devices are operably connected to the computer network, wherein trading order messages, match mask filters, market data messages, client identifications, last look indicators, trade match messages, trade execution messages, trade cancellation messages, trade confirmation messages, and trade failed messages are stored. One or more servers are operably connected to the computer network, having a processor and a memory configured to receive client trading order messages, match mask filters, associated client identifier information, last look indicators, trade execution messages, and trade cancellation messages from the client devices.

The system is configured to compare and match trading order messages in real-time and apply client-created match masking requirements.

The system is comprised of one or more servers configured to receive and store one or more trading order messages, one or more match mask messages, last look indicators, and associated client identifier information. The system is configured to compare and match trading order messages in real-time, generate one or more market data messages, distribute the market data messages to the one or more client devices, and send the one or more data messages to one or more data storage devices located on the network.

The one or more data storage devices are configured to access information needed to perform the functions of the network market system. The information including trading order messages, match mask messages, market data messages consisting of executed and unmatched trading order messages and any other necessary information.

BRIEF DESCRIPTION OF DRAWINGS

The detailed description will refer to the following drawings in which:

FIG. 4 is a chart providing an example of a matching book table which may be utilized by ATPMS to match trading order messages utilizing methods described herein.

DETAILED DESCRIPTION

The Anonymous Transparent Price Matching System (hereinafter "ATPMS") allows market participants to buy and sell financial or tangible products in either semi-anonymous or fully-anonymous transactions by utilizing a combination of each market participants' unique client identifier ("CLIENT ID") along with a "match mask" either included in, or otherwise associated with each market participants' trading order message to drive the matching engine. For the purposes of clarity in this description, the term "client" will be utilized to refer to the market participant who is creating the trading order in question, whereas all other traders will be referred to simply as "market participant." It should be recognized, however that all clients are also market participants.

Figure 1:
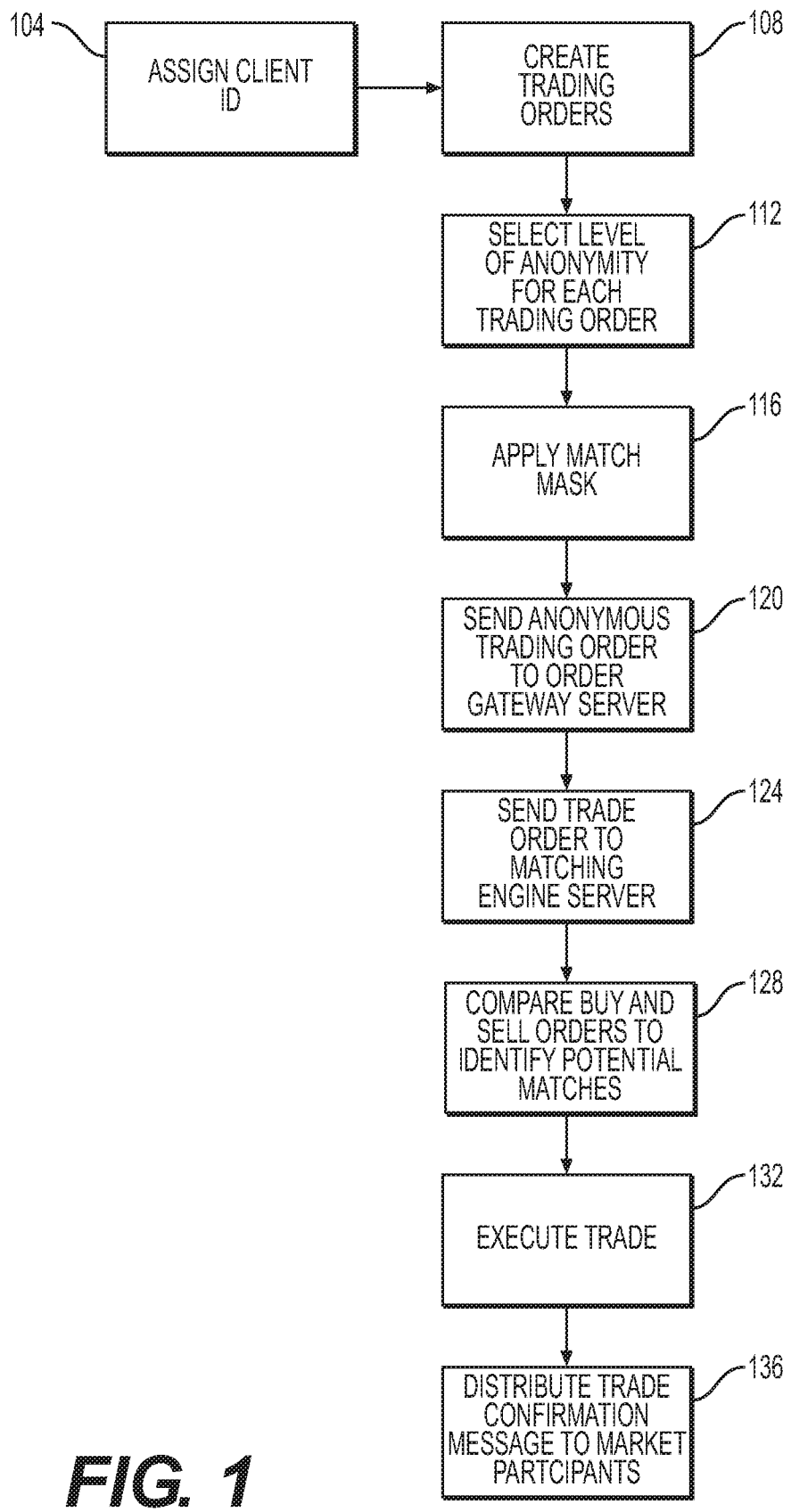
FIG. 1 is a flow diagram showing a price matching process flow of a trading order from a client through to execution of the trade.

Referring generally to FIG. 1, when utilizing ATPMS, according to one embodiment, market participants enter the system and are assigned a CLIENT ID 104. For example, if five clients are utilizing the system, they may be assigned CLIENT IDs 1, 2, 3, 4 and 5, with, perhaps CLIENT ID 0 reserved for use by any market participant wishing to engage in fully anonymous trading (This example of five clients will be utilized throughout the description of the invention). Generally, the system will make the CLIENT ID of each participant available to other market participants, however, the system will not share market participant names unless the client specifically chooses to do so. Therefore, by allowing market participants to trade on the system utilizing only their assigned CLIENT ID, it allows each participant to enter into anonymous transactions wherein market participants can observe the trading behaviors of other participants over time, yet will not know of the participants' true identity.

In alternative embodiments, ATPMS allows market participants to use a fully anonymous CLIENT ID for a particular transaction. In this way, the market participant's behavior cannot be monitored. In this alternative, a predetermined CLIENT IDs (typically zero) may be used by any market participant who wishes to engage in fully anonymous transactions.

Once market participants have received or generated a CLIENT ID, clients are able to place trading orders by creating trading order messages 108 indicating, among other criteria, buy or sell amount, a minimum amount for trade execution, a last look indicator, and a last look timer, for instance. In some embodiments, the creation of one of more trading orders step 108 may be implemented in one or more client processing devices, referred to herein as a Client Computer System 200. Clients select the level of anonymity for each order 112 and match masks are created in accordance with client wishes. After creation, the match masks are applied 116 to the orders.

FIG. 1 shows the following additional steps of the price matching process which are described below: sending anonymous trading order to Order Gateway Server 120, sending the trading order to Matching Engine 124, comparing buy and sell orders to identify potential matches 128, execute trade 132, and distribute trade confirmation message to market participants 136.

Figure 2:
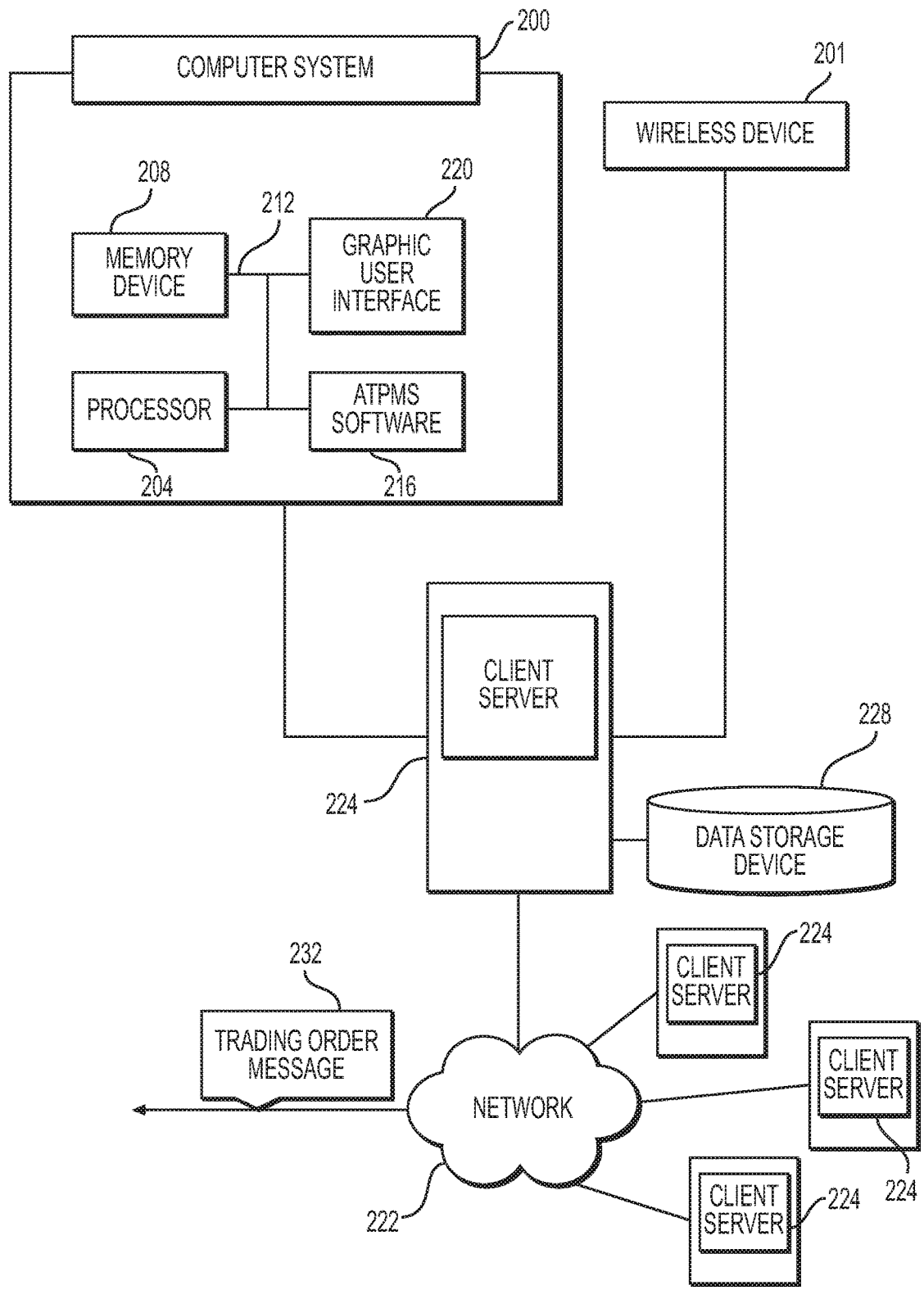
FIG. 2 is a schematic of an example of a client computer system enabled for executing the methods described herein.

Referring now to FIG. 2, said Client Computer System 200 described herein are computer systems which may include one or more processors 204 coupled to one or more memory devices 208, circuits designed to process information 212, software 216 configured to execute program instructions embedded in the one or more memory devices, a graphic user interface 220, and any other processing devices familiar to someone skilled in the art. The program instructions, when executed by the one or more processors, will cause the price matching system to perform the methods, processes and techniques described herein, including creating, receiving, processing, sending, matching, filtering, storing and distributing trading order, match mask, market data, and other messages described herein. The program instructions can be organized in various ways including all software residing at one location or multiple locations and processing of the programs at one processor or distributed across the system servers. The step of creating trading order by the client 108 may also be implemented on any number of wireless, handheld, or other similar devices that process and send information to a given client's server 224, which contains one or more data storage devices 228. All such devices function the same, to carry out operation of trade order creating 108.

Clients may create trading order messages 232 utilizing ATPMS to place trading orders of various types and containing any number of attributes. The trading order messages 232 allow clients to specify criteria for fulfillment of their trading order. For example, clients may create the following trading order 108 types having the following attributes, or any combination thereof:

Market Orders (fill at any best available price);

Limit Orders (fill at a price no worse than specified price);

All or None Orders (fill all my order completely or not at all);

Min Amount Orders (fill at least the specified amount or nothing);

Stop Loss Orders (trigger sell order when price below X) (trigger buy order when price above X);

Take Profit Orders (trigger sell order when profit above X);

Expiration Option Orders: order is good until X (good for some number of days/good until canceled/good until specific time/good for some number of seconds);

Immediate or Cancel Orders (fill order immediately, if not cancel it); Trailing Stop Orders: a sell trailing stop order sets the stop price at a fixed amount below the market price with an attached "trailing" amount. As the market price rises, the stop price rises by the trail amount, but if the stock price falls, the stop loss price doesn't change, and a market order is submitted when the stop price is reached;

One Cancels Other Orders (OCO): a pair of orders stipulating that if one order is executed, then the other order is automatically canceled. A one-cancels-the-other order combines a stop order with a limit order on an automated trading platform. When either the stop or limit level is reached and the order executed, the other order will be automatically canceled. Seasoned traders use OCO orders to mitigate risk; or Conditional Orders: activate my order if XYZ happens. One having ordinary skill in the art will recognize that the list above is only exemplary and does not in any way limit a client's abilities to create trading order messages 108 of any desired type and containing any number of desired attributes.

Next, the client chooses who they wish to trade with, or who they specifically do not wish to trade with, by applying a match mask 112 to the trading order message 232. Referring again to FIG. 1, this occurs at operation 112. Based on these selections, a match mask is applied to the trading order. The client may choose to trade with one, some, or all market participants based on whatever criteria the client wants to apply.

As an improvement, market participants can include a match mask containing one or more CLIENT IDs of other market participants, within their trading order messages 232, or as a separate match mask message in conjunction therewith, to facilitate fully anonymous customer trading. Match masks, for example, consist of participant specified trading criteria including one or more CLIENT IDs of other market participants of whom the participant wishes to trade with. Therefore, by utilizing match masks, clients are able to determine their trading counter-parties without the need for human intervention at the ECN Distribution level; clients can simply specify their desired trading counter-parties within their match mask message. Match masks are available to all market participants, thus creating a level playing field. When utilizing ATPMS, match masks allow market-makers to send market participant-specific pricing and differentiated pricing to market segments and to analyze market participant flow so they can make informed pricing adjustments in real-time. Match masks also allow market-takers to analyze the performance of their market-makers; spread flow between multiple market-makers (for example, they may choose to reduce the amount they trade with specific market-makers); and to filter market data they receive from every market-maker.

Generally, a client will create one or more match mask profiles to store on their computer system 200 memory device 208. This will enable the client to choose a saved match mask profile to apply to each trading order based on their trading criteria for each trade. Alternatively, the client may create a new match mask to apply or choose to apply no match mask at all to an individual trading order.

Prior to application, various methods can be used to create a match mask. Each client may use custom software or software provided by a third party to generate the match masks. In many embodiments, a user interface 220 is used to accept the client's selection of client ID numbers that the client is interested in trading with. On any given trade, the client may select a subset of the available parties to trade with by designating their numbers to the user interface 220.

The user interface 220 allows a client to designate, for each trade, which client ID numbers will be allowed to accept the order and any additional requested features such as last look. Various types of user interfaces and computer input means and screens may be used to inquire and accept the user input. The user interface software 220 may be operated at the user site or remotely. For example, the user software 220 and even other parts of the system may be hosted on a server for the client.

As discussed above, a client may create in advance, match masks and save them for repeated use. Once the user interface 220 has the trading order information, it will ask the client whether an existing mask or a new mask should be associated with the trade order. If the client selects existing mask, then a list of masks are shown to the client. This list may be shown with shorthand names or nicknames associated with each previously saved match masks. In one embodiment, the previously created match masks are shown in a pull-down menu for selection. On the other hand, if the client chooses through the user interface 220 to create a new match mask for a particular order, then the user interface will step the client through available choices for creating a match mask.

In particular, the user interface 220 will help the client to create a new mask for use in the match masking system by stepping the user through the process. The user interface 220 request, from the client, which client IDs should be placed in the match mask for trading. It will set the selected client ID positions in the mask as 1's, positive or true depending upon the mask being used by the system. Alternatively, the user interface 220 through a display will request which Client ID numbers should be excluded from the match mask. In this situation, the entire mask would be set to 1's, positives or true depending on the particular match masking system. Afterwards, those desired to be excluded would be changed back to zero, negative or false. Once all the choices of client ID are made, the mask is generated by the system. In some embodiments, this last step of generation converts the mask from one format to another such as to or from binary, hexadecimal, alpha-numeric, a matrix, a table, a map, a chart or other mask system. Finally, the mask may be compressed for storage, later use and for transmission. Standard compression techniques may be used with the mask.

In some embodiments, the user interface will request information on last look instructions. In these embodiments, last look instructions may be added to the match mask.

Once the user interface 220 has obtained the information to create the match mask, it will generate or encode the match mask. In some embodiments, following generation of the match mask, the user interface will display a question to the client. Do you wish to save this match mask for future use? If so, please provide a name for the match mask. If the user responds that he wishes to save the match mask, the match mask will be saved along with a name for future reference and use.

Generating the match masks entail encoding the client ID numbers into a mask. Encoding masks or generating masks can be performed in a number of ways. In one example, a simple binary mask is used. In one such embodiment, each client is assigned a specific binary number (e.g., client ID numbers 0, 2, 4, 8, 16, 32) to represent the client. In other words, each client is assigned a binary placeholder. Client 1 may be assigned position 0. The next client may be assigned the next position, binary 2 and then the third binary position 4 and so on. To generate the mask, in effect a binary 1 is placed at each binary location that the client wishes to trade. Therefore, if a client only wishes to trade with the third client assigned binary number 4, the mask generated would be 100, wherein the number is read from right to left. A zero would be place in the first and second positions signifying no trading with the first two clients. A one is placed in the third position to request trading with the third client or the client assigned binary 4.

By using a binary system, such as that described, a computer can simply perform shifts to code a mask. For example, left shifts to code or identify client ID numbers. In other words, the third client can be coded as a 1 by executing three shifts to the left and the fourth client as four shifts to the left. In one example, the first digit of a mask is reserved for anonymous trading. In another embodiment, the first digit is reserved for a last look indicator or flag. In yet another embodiment, the first digit can be used to identify a client, client identification "0."

The mask encoding or generation may be performed at the client site or elsewhere. In some embodiments, the masks are generated and stored on the server system. In a fully hosted system, the user interface and client activities would occur on the cloud, at a remote server or at one of the servers, such as the order gateway.

Participants in the professional trading market typically analyze their own trading behavior. Commonly, this analysis is from a mathematical point of view. This analysis practice is generally called TCA (Transaction Costs Analysis). Users of ATPMS will have enhanced TCA abilities because of the provided CLIENT ID in each transaction. Trades can be analyzed on a client identification basis. Additionally, TCA techniques can be used by participants to create match masks optimized for their individual requirements. In other words, based on the analysis, clients can generate masks to trade with certain market participants for certain types of transactions. These masks can be stored and used as appropriate by clients.

One having ordinary skill in the art will recognize that the match mask identified in FIG. 1 and described above may be compressed by any conventional compression software, which may be stored within the system.

For each trading order, the client selects the level of anonymity they want to be attached to the trading order message 232. Referring now to FIG. 1, this occurs at operation 116. If they choose, they can be identifiable by client identification, or they may choose to be fully anonymous (e.g., using reserved CLIENT ID zero, or other reserved client identification number). This allows a customizable trading order in terms of anonymity, and is an improvement over existing methods of initiating a trading order.

As described, a client may continue to trade under an existing client ID which will make the client anonymous but inform the other traders of past performance by consistent use of the same client identification. In yet another embodiment, the client can provide identifying information which will make the client known to all or some the other traders, even though the other traders may choose to remain anonymous on the system.

Referring again to FIG. 1, once the trading order message 232 has been fully created by the client, with match mask information and level of anonymity applied, said trading order message is sent 120 by the client server 224, through the network 222, to an ATPMS-enabled system 300 for processing, checking, matching, verifying, and executing the trading order.

Figure 3A:
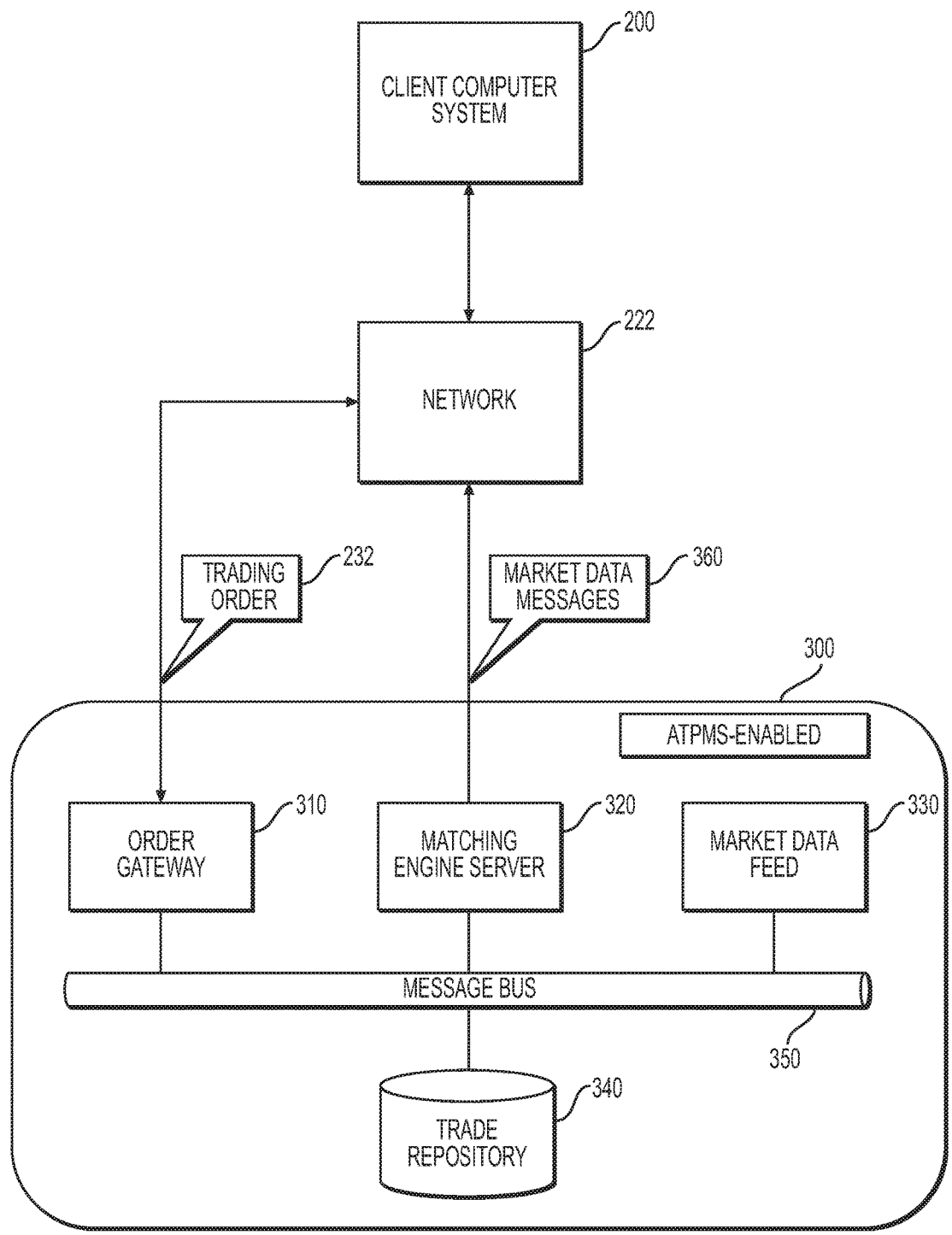
FIG. 3A is a schematic showing an example of an Anonymous Transparent Price Matching System (hereinafter "ATPMS") network for executing methods described herein.
Figure 3B:
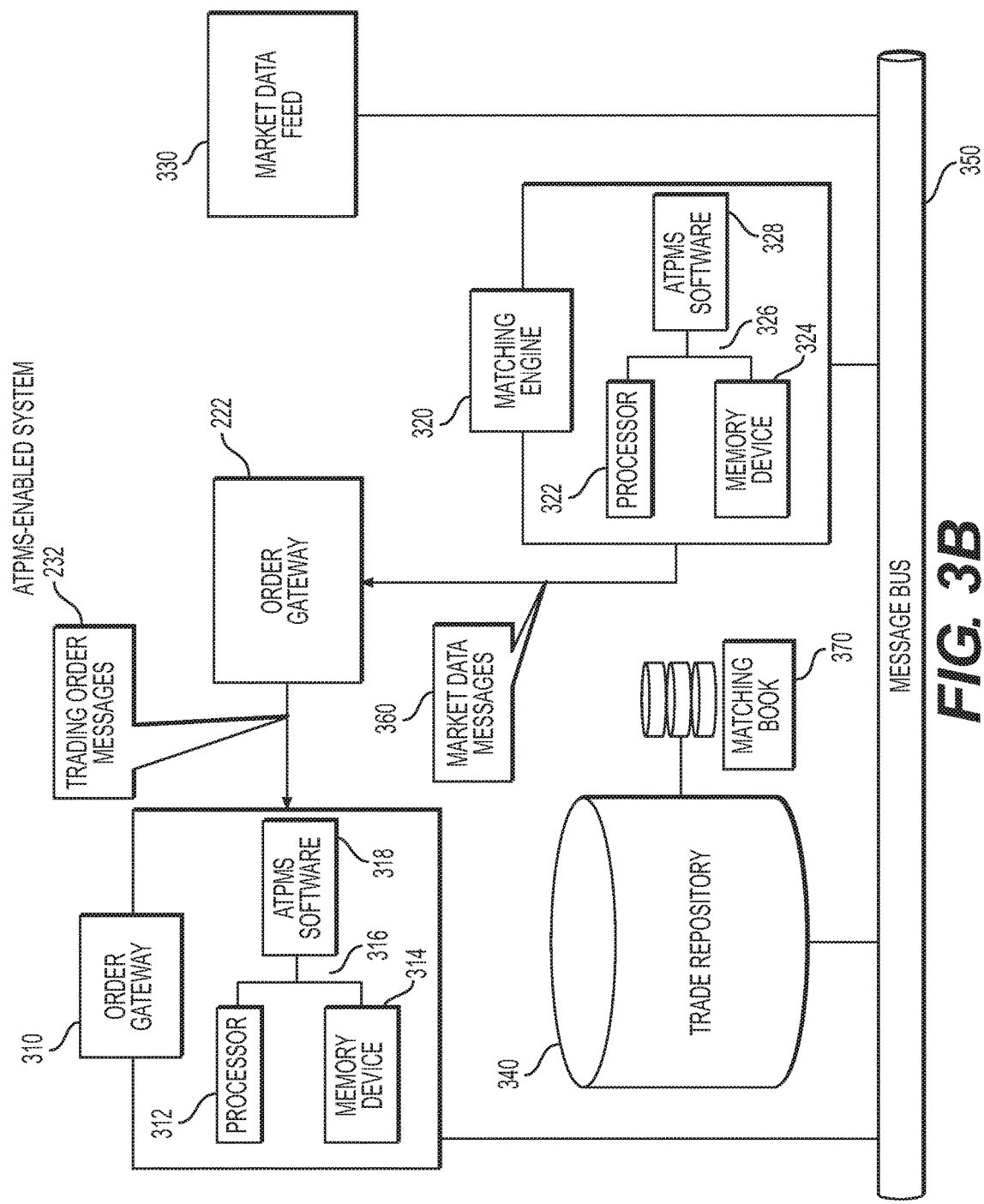
FIG. 3B is a schematic showing an example of a system of servers that process, match, and execute trading order messages between market participants.

FIG. 3 provides an example of a ATPMS-enabled system 300. An anonymous transparent price matching system such as the one depicted in FIG. 3, may include one or more ATPMS-enabled computer systems 200 connected to a network 222 (this may be a public network (e.g., the Internet), a private network (e.g., a local area network (LAN)) or wide area network (WAN)), or other network of interconnected computers known to those skilled in the art).

Referring to FIG. 3, the ATPMS-enabled trading system may include one or more of: an Order Gateway Server 310, a Matching Engine Server 320, Market Data Feed 330, and one or more data storage devices. The one or more data storage devices may include a trade repository 340 which stores, or is configured to access, information needed to perform the functions of the price matching system, which may include trading order messages, match mask messages, market data messages consisting of executed and unmatched trading order messages and any other necessary information or data. Embodiments of the claimed invention may also include a connecting mechanism or device, such as a message bus 350, wherein the connecting device or message bus enables various components of the system (e.g. the servers) to communicate with one another.

The Order Gateway Server 310 is configured to receive customer trading order messages 232, along with their associated match masks and unique CLIENT IDs. Referring now to FIG. 3A, the Order Gateway Server 310 may contain processors 312, memory devices 314, a circuit designed to process information 316, software 318 encoded to carry out the processes described herein, and any other processing devices familiar to someone skilled in the art. The Order Gateway Server 310 is configured to check trading order messages 232 for consistency with rules and logs. These rules and logs function to check the trading order message 232 meets the criteria prescribed by the market. If the trading order message 232 fails to meet the rules and logs, the Order Gateway Server 310 returns the trading order message 232 with a notice to the client indicating a need to correct the deficiency and resubmit the trading order message 232. Once the Order Gateway Server 310 verifies the trading order message 232 is consistent with these rules and logs, the Order Gateway Server 310 processes and forwards the trading order message 232 and associated match mask to a Matching Engine Server 320 through, for example, a message bus 350. Referring now to FIG. 1, this occurs at operation 124.

Referring once more to FIG. 3, the Matching Engine Server 320 is configured to: receive, compare, and match trading order messages 232 in real-time; generate one or more market data messages 360; distribute the market data messages 360 to the one or more client computer systems 200 and to send the one or more market data messages 360 to one or more trade repositories 340 and/or client memory devices 208. Referring now to FIG. 3A, the Matching Engine Server 320 may contain processors 322, memory devices 324, a circuit designed to process information 326, software 328 encoded to carry out the processes described herein, and any other processing devices familiar to someone skilled in the art. The Matching Engine Server 320 will store the trading order in the memory device 324, in a separate trade repository storage device 340, or in a matching book database 370.

The Matching Engine Server 320 also publishes data to any number of Market Data Feeds 330. Market Data Feeds 330 are any systems that provide market data reported by any trading venue known to someone skilled in the art.

In one embodiment of the invention messages (including orders and cancels) maybe queued before the matching processes for some amount of time. The amount of time may be statically controlled, statistically controlled or random or within a random time window. Messages would remain in the pre-matching queue until the time expires before forwarding to for matching. The pre-matching queue can be implemented in the matching engine, the order gateway, or external device.

In one embodiment of the system, a reserved and pre-defined account ID (e.g., zero) maybe used by participants. When an order is created with its account ID set to zero (rather than the actual client ID), that order will be anonymous as to the originator of the order. This allows the user the flexibility of being totally anonymous for certain orders. The anonymous trade orders can be handled by the system in a number of ways. One way, is to make the order available for matching with all clients effectively bypassing the match mask feature. In another embodiment, only trade orders that have a mask that accepts anonymous traders will be matched (e.g., a positive or one in the anonymous client identification position). In yet another embodiment, the full match masking process is conducted so that the anonymous trader can still select client identifications with which to trade (even though the trader remains anonymous).

In yet another embodiment of the system, users may set a flag on each order specifying whether any market data should be generated from a particular order. Therefore, if this flag is set to true, no market data would be generated. Thus, no other participant would know of the order unless they had an order that was matched against it.

Referring now to FIG. 3, when the Matching Engine Server 320 filters trading orders 232 for matches on the system it will only match trading orders contained in the matching book database 370 that meet the client and market participant-specified criteria. The Matching Engine Server 320 will filter and match for typical trade order variables (e.g., price and quantity) and will match the masks. The Matching Engine Server 320 may perform either the filter for trade order variables or the match mask first, followed by the other.

Based on the match mask applied by the client, the Matching Engine Server 320 will filter out the trading orders so that only trading orders that meet the match mask requirements are potentially matched. Referring to FIG. 1, this occurs at operation 128.

The process of matching of the masks 128, match masking, determines whether the masks applied on two (or more) orders (that are being compared or potentially matched), each lists (e.g., designates, marks as positive or true) the other orders client identification. If so, then there is a match mask and the two orders are matched for possible execution. In other words, each order allows execution with the client originating the other order.

For example, the market participant identified by CLIENT ID 5 may generally prefer to trade products with only those participants identified by CLIENT IDs 1, 3, and 4. Utilizing ATPMS, the market participant identified by CLIENT ID 5 would have created a default match mask message which includes the CLIENT IDs of clients 1, 3 and 4 (eg. default message—011010 (read right to left)), which the market participant will utilize for most of its transactions utilizing the system. Thus, when market participant identified by CLIENT ID 5 offers to trade financial products utilizing his/her preexisting or default match mask message, 011010, the Matching Engine Server 320 will only match CLIENT ID 5's trading offers with market participants identified by CLIENT IDs 1, 3 and 4 (and not with CLIENT IDs 0, 2 or 6). Therefore, the use of a default match mask message allows clients to trade with other market participants with whom they regularly trade without the need of creating a new match mask message for each trading session.

In the above case, a simple binary match masking system (1 and 0) is shown in which the digit furthest to the right represents market participant 0 and each digit moving left represents the next market participant; market participant 1, 2, 3, etc. If the digit that represents the market participant in the proper binary location is a 1, the trade is available to be matched and possibly closed. If the market participant digit in the proper location is zero, this client does not wish to trade with that particular market participant and the Matching Engine Server 320 will not match the trading order.

Matching of binary and other masks can be performed using standard computer commands. For example, Given: OrderA with mask maskA and client AND clientA and OrderB with mask maskB and client ID clientB
Where & equals the bitwise AND operator
Where << is the bitwise left shift operator
Where && is the logical AND operator
if (maskA & (1<<clientB) && (maskB & (1<<clientA))
then
PROCESS WITH MATCH
else
NO MATCH commands return match or no match (e.g., a one or zero, true of false, etc.). The return of one or true would indicate the presence of a client ID. More specifically, a command such as BITWISE and POWER (2, 8) would look to see if the number provided for analysis (e.g. 24) when converted to powers of two includes an 8. 24 is equal to 11000 in binary (one digit representing 16 (2 to the power of 4=16) and one digit representing 8 (2 to the power of 3=8); 16+8=24); and includes the 8 bit; so the return or answer is yes.

Using this methodology, with little programming, a computer is able to quickly determine the presence of a particular client ID in a mask. Various other powers may be used instead of 2 to achieve the same result.

In alternative embodiments, other match masking methods of identifying market participants may be used, such as alpha-numeric, hexa-decimal, a matrix, a table, a map, a chart, etc. These may be generated and stored in the same way as the binary mask. Someone skilled in the art of computer science will recognize that any such encoding of a list of client identifications can be reduced to a bit mask using standard programming techniques.

In an alternative embodiment, clients can create customized match mask messages in which they specify different client segments, e.g. preferred traders vs. non-preferred traders. For example, a market participant my wish to trade with participants 1, 3 and 4 as their preferred trading counter-parties and thus have a match mask of 011010 as their default match mask message as discussed above. In addition to their default message of 011010, the participant may also create a customized match mask message for other trades. For example, fully anonymous trading (or for any other purpose) wherein the client may use a one-time or one transaction assigned CLIENT ID, the trader may only indicate CLIENT ID 0 as their trading counter-party and thus will use the match mask message 000001 to engage in fully anonymous trading.

In most embodiments, each market participant has the option of creating as many customized match mask messages as they would like using the system. The use of customized match masks helps facilitate market participant-specific pricing, preferred trading, and offering of differentiated pricing to certain market segments. Once created, match masks may be stored for later use.

The Matching Engine Server processor 322, enabled by software 328 coded to perform the associated tasks discussed in this process, next compares the client's trading order message 232 to zero or more market data feeds 330 information to identify potential matches based on order type, quantities, and prices with those market participants that the match mask specifies, thus ensuring only counter-parties that a client specified to trade with (if they made such a choice) are chosen as potential matches.

FIG. 4 depicts an example of a table of trading orders which may be stored in a matching book database 370, and compared and matched by the Matching Engine Server 320 according to the method described. Order numbers are generated in the system to represent an individual trading order by a market participant. The exemplary trading orders shown in FIG. 4 depicts the following results: Order 401 and order 405 match and will result in a trade because, in accordance with methods described for the match masking process:

a) the buy price is greater than or equal to the sell price (e.g. the market participant who created order 401 and is identified in the system by CLIENT ID "2" seeks to buy 100 items at a rate of 50 dollars which is equal to the rate at which 250 items are being sold by the market participant who created order 405, identified by CLIENT ID "1");

b) the CLIENT ID of the sell order (CLIENT ID 1) is included in the mask of the buy order (e.g. order mask 110110 indicates that the market participant identified by CLIENT ID 2 wishes to trade with counter-parties who will be identified by CLIENT IDs 1, 2, 4 and 5); and c) the CLIENT ID of the buy order (CLIENT ID 2) is included in the mask of the sell order (101100 indicates that the market participant identified by CLIENT ID 1 wishes to trade with counter-parties who will be identified by CLIENT IDs 1, 2, 3, and 5);

Order 401 and 404 are identified by the matching engine as potential matches because the buy price is greater than or equal to the sell price, however the orders are not matched and do not result in a trade because neither the CLIENT ID of the sell order (CLIENT ID 3) is included in the mask of the buy order (110110) nor the CLIENT ID of the buy order (CLIENT ID 2) is included in the mask of the sell order (100010).

The remaining orders depicted in FIG. 4 do not have matching rates (e.g. the buy rate is greater than or equal to the sell rate) and would therefore not be matched and would remain unexecuted according to methods described herein. Once orders 401 and 405 are matched in accordance with the methods disclosed herein, a trade is executed and a trade confirmation message would be sent to both market participants who created orders 401 and 405 indicating that 100 items of CLIENT ID 1's 250 item sell order will be traded and the remaining unmatched items will remain in the matching book database 370. In this example a market data message 360 that updates the remaining amount of 150 items on order id 405 would be published. The unexecuted orders would remain in the matching book database 370.

In an alternative embodiment, the Matching Engine Server 320 may first identify potential trade matches based on order type, quantities, and prices, and then apply the match mask filter as described above to ensure only counter-parties that a client specified to trade with (if they made such a choice) are chosen as potential matches.

Once a potential trading match has been identified by the Matching Engine Server 320, it then determines if a last look indicator is attached to the trading order. Within the communicated trade order, the last look can be indicated within the mask, such as a 1 in the first position, or as a separate flag or variable. If there is no last look indicator (e.g., last look indicator not positive), the Matching Engine Server 320 executes the trade with the first available market participant that matches the trading order parameters (quantity, price, etc.) and meets the match mask requirements. Referring again to FIG. 1, this occurs at operation 132. Once the trade is completed, a trade confirmation message is generated and sent to the client. This occurs at operation 136. The Anonymous Transparent Price Matching System process is graphically depicted in its entirety as a flow diagram on FIG. 5.

Figure 5:
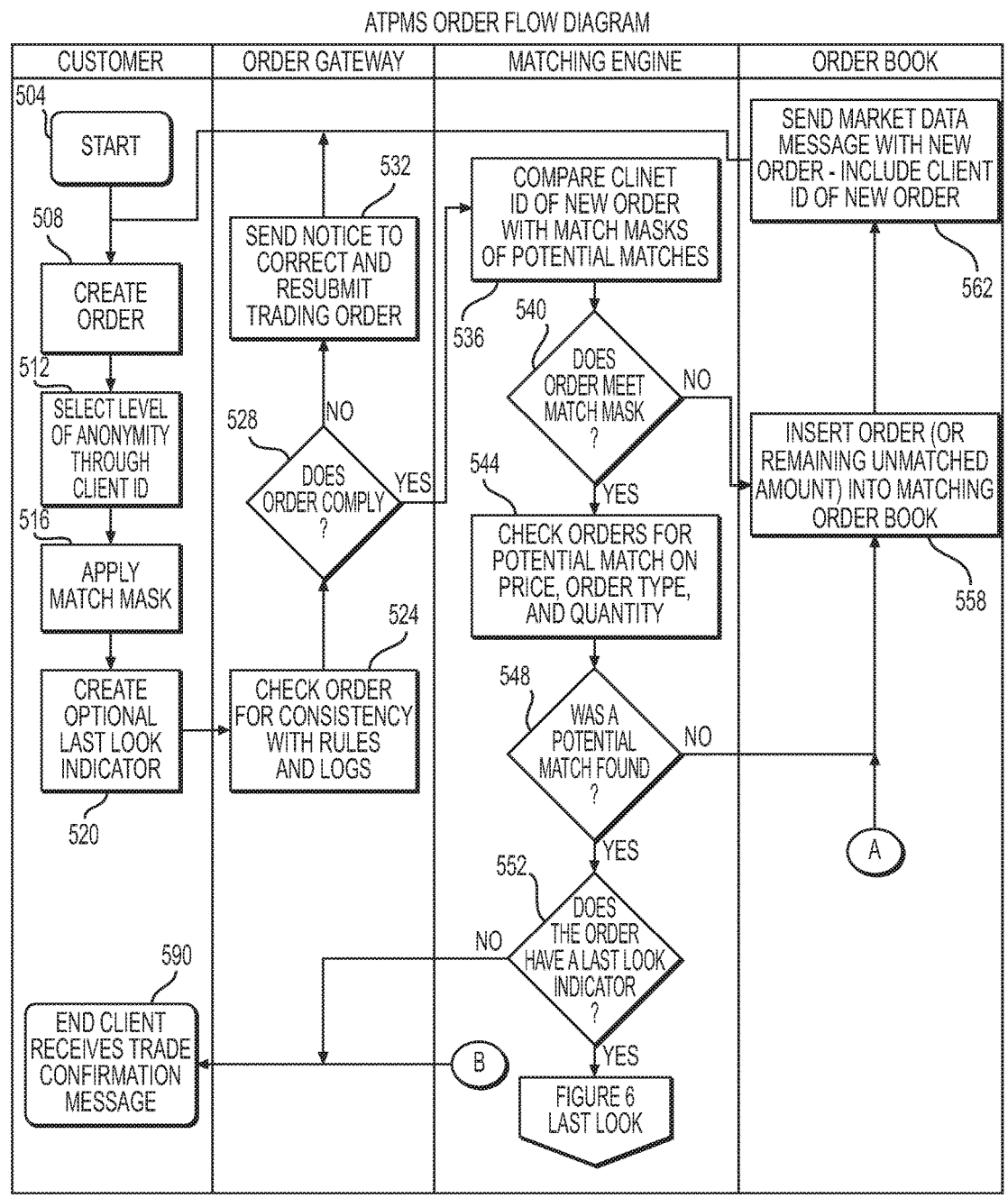
FIG. 5 is a flow diagram showing an exemplary trading order flow of an ATPMS when a market participant engages in anonymous transparent trading utilizing the systems and methods described herein.

Referring generally to FIG. 5, the client creates a trading order on the client computer system 508. The client then selects, a CLIENT ID (either assigned CLIENT ID or the reserved CLIENT ID for anonymous (e.g., zero)), depending on the level of anonymity the client chooses 512. The client then applies a match mask using the techniques described herein 516. Prior to applying a match mask, the client may generate a mask. The client may use a user interface 220 to help generate the mask. The client then has the option to create a last look indicator for the trading order 520.

The trading order message 232 is then forwarded to the Order Gateway Server 310, where it is checked for consistency with the rules and logs 524. The Order Gateway Server 310 determines whether or not the trading order message 232 complies with the rules and logs 528. If the trading order doesn't comply with the rules and logs, a notice is sent to the client to correct and resubmit the trading order 532. If the trading order message 232 is found to comply with the rules and logs, it is then forwarded to the Matching Engine Server 320, where the CLIENT ID and match mask of the new order is compared with the match masks of potential trade matches 536. If a potential trade order doesn't meet the requirements of the match mask 540, the trade is inserted into the matching order book 558, and a market data message is sent to the client 562.

If the trade order meets the match mask requirements specified by the client 540, then the Matching Engine Server 320 checks the orders for potential matches based on price, order type, and quantity 544. If no match is found, the trade is inserted into the matching order book 558, and a market data message is sent to the client 562. If a match is found 548, the Matching Engine Server 320 checks to see if the trading order message 232 contains a last look indicator 552. If there is no last look indicator, the trade is executed and the client receives a trade confirmation message 590. If a last look indicator does exist, the trade proceeds in accordance with FIG. 6 as described below.

Figure 6:
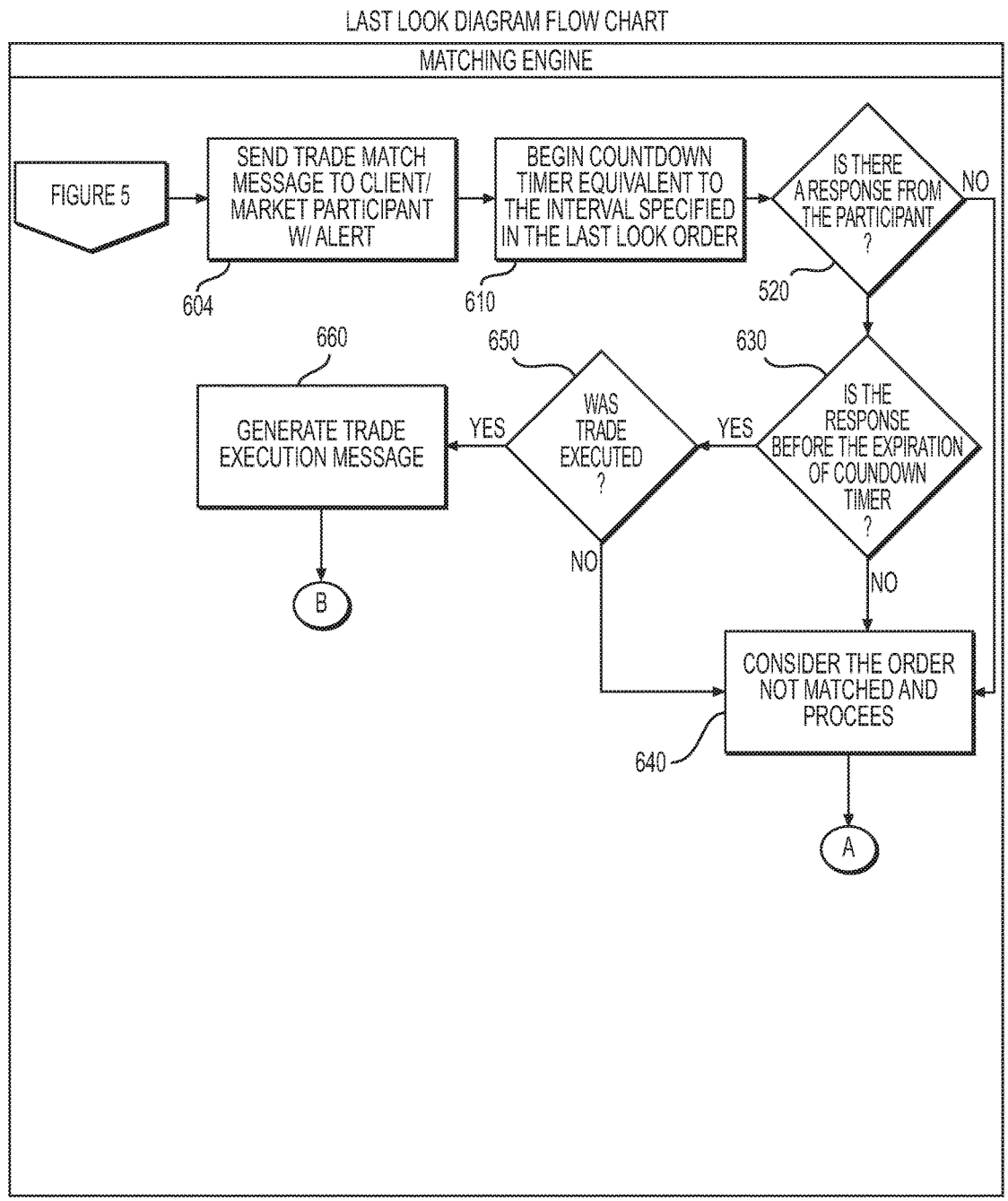
FIG. 6 is a flow diagram showing an exemplary flow for a last look procedure which may be followed when one of two potentially matched trading order messages contains a last look indicator.

FIG. 6 provides an exemplary last look flow diagram which may be followed when one of two potentially matched trading order messages 232 contains a last look indicator. If a last look indicator is attached to the trading order, a trade match message identifying the potential trade and an alert message is generated by the Matching Engine Server 320 and is sent to the client or market participant, as applicable (whomever attached the last look indicator) 604. The client, once they receive the trade match message and alert message, can review the potential trade and choose whether or not to execute the trade 620. If the client decides to proceed with the trade, they accept the trade 650 and the client's system sends a trade execution message 660 to the Matching Engine Server 320. Referring again to FIG. 5, the Matching Engine Server 320 processes the trade, generates a trade confirmation message, and sends the trade confirmation to both the client and market participant involved in that transaction 590.

Further yet, if the trading order message 232 contains a last look order indicator, the method may further include initiating a countdown timer equal to the interval specified in the last look order. This optional feature monitors the amount of time remaining on the last look at the order.

Referring generally to FIG. 6, if an order has a last look indicator it can only be matched against other non-last look orders. When the Matching Engine Server 320 encounters a last look order that matches with a non-last look order the matching engine sends the client or market participant who created the last look order a trade match message identifying the potential trade and an alert message and begins a countdown timer 610 equal to the interval specified in the last look order. The client or market participant who created the last look order must then send trade execution message acknowledging the trading as executed or rejected within the allotted time. One of three outcomes is possible in this chain of events:

If the trade is executed before the timer counts to zero 630, the Matching Engine Server 320 processes the trade 650, generates a trade confirmation message, and sends the trade confirmation to both the client and market participant involved in that transaction 660.

If the trade is rejected by the last look client or market participant, the order is considered not matched 640 and, referring to FIG. 5, the order remains in the matching order book database 558.

If the participant who created the last look order does not respond before the countdown timer expires then the order is considered not matched 640 and, referring to FIG. 5, the order remains in the matching order book database 558.

If an order is not matched by the Matching Engine Server 320, or is only partially matched, then the trading order, or remaining unmatched amount, is inserted into the matching book database 370 and a market data message 360 is generated and sent back through the system processes as a new trading order, including the CLIENT ID of the new order therewith. Referring again to FIG. 5, this occurs at operation 555.

Further features of this one aspect include, for example, compiling market data messages 360 associated with the CLIENT IDs of the market participants utilizing the system and generating, for use in a display, information indicating all consummated trades associated with said CLIENT ID, wherein the display information further aids the client in analyzing its performance, client flow and performance of their market-makers.

Further features of this one aspect include, for example, compiling market data messages 360 associated with each market participant utilizing the system. This can include: isolating consummated trades by CLIENT ID; generating, for use in a display, information indicating all consummated trades over the entire system for a specified time period; and making accessible to each market participant said information upon request, wherein each client can view the marketplace as a whole by accessing all consummated trades within a given time period. The client can also see the behavior of individual traders and can compare to other market participants on the system.

The steps or parts of the steps and methods described herein, may be implemented with hardware or by execution of code such as apps, programs, modules, or scripts. The apps, programs, modules, or scripts may be stored or embodied on one or more computer readable mediums in a variety of formats, including source code, object code, or executable code, among other formats. The computer readable mediums may include, for example, both storage devices and signals.

The methods and computer readable medium may be used in conjunction with PCs, portable computing devices, laptops, handheld devices, and wireless devices 201.

The terms and descriptions used herein are set forth by way of illustration only and are not meant as limitations. Those skilled in the art will appreciate these and other advantages and benefits of various embodiments of the invention upon reading the above description and the claims as defined in the following claims, and their equivalents, in which all terms are to be understood in their broadest possible sense unless otherwise indicated.

What is claimed:

1. A network market system that allows clients to choose to remain anonymous through the use of match masks, the system comprising:
   a computer network;
   at least two client devices, operably connected to the computer network, having a processor, a memory, and user interface configured to:
      create a trade order message and associate the created trading order message with a client using a client identification;
      provide the client an option to apply a match mask to the created trading order message, wherein the match mask allows the client to choose which market participants the client is willing to trade with;
      apply the match mask to the created trading order message when the client selects the option to apply said match mask;
      provide the client an option to apply a last look indicator to the created trading order message;

apply the last look indicator to the created trading order message when the client selects the option to apply said last look indicator;

send the created trading order message with the applied match mask;

receive trade match messages;

render, for use in a display, said trade match messages;

one or more data storage devices, operably connected to the computer network, wherein trading order messages including executed and unmatched trading order messages, match masks, market data messages, client identifications, last look indicators, trade execution messages, trade confirmation messages, and trade failed messages are stored; and one or more servers, operably connected to the computer network, having a processor and a memory configured to:

receive client trading order messages, match masks, client identification, last look indicators, trade execution messages, and trade cancellation messages from the client devices;

access data from the one or more data storage devices;

compare and match trading order messages in real-time including matching match masks associated with trading orders, wherein trade order messages with applied match masks are matched for execution only when a matching match mask is identified;

generate one or more market data messages;

distribute the market data messages to the at least two client devices; and send the one or more data messages to one or more data storage devices.

2. The system of claim 1 wherein the at least two client devices are further configured to create a unique client identification.

3. The system of claim 1 wherein the client identification is selected by the client as anonymous.

4. The system of claim 1 wherein the at least two client devices are further configured to accept user input including identification of acceptable market participants and generate, using the accepted user inputs, a mask to be applied as a match mask to a trading order.

5. The system of claim 4 wherein the at least two client devices are further configured to label and store generated match masks for later use by said client in applying to another trading order message.

6. The system of claim 1 wherein the at least two client devices are further configured to create a binary match mask to be applied to a trading order.

7. The system of claim 1 wherein the server is further configured to perform a binary match mask comparison.

8. The system of claim 1 wherein the match mask includes said last look indicator.

9. The system of claim 1 wherein the at least two client devices are further configured to:

receive market data messages from one or more market participants;

render, for use in a display, said market data messages from one or more market participants;

create an alert message for the client that approval to execute a trade is required if the trading order message contains a last look indicator;

render, for use in a display, said alert message;

provide the client the option to approve or disapprove the trade;

send a trade execution message or a trade cancellation message;

receive a trade confirmation message or a trade failed message; and render, for use in said display, said trade confirmation message or trade failed message.

10. A computerized method for facilitating anonymity and selectively by allowing anonymous and selective interactions within a network system, the method comprising:

generating a unique client identifier for a market participant utilizing a client device located on a network, wherein the market participant is either a market maker or market taker;

receiving a trading order message from said market participant and associating the trading order message with the unique client identifier, wherein the trading order message includes a price or rate, minimum amount, and any other market participant identified trading criteria, and an order indicator that is selected from the group consisting of: a buy order, a sell order, a market order, a limit order, an all or none order, a min amount, a stop loss order, a take profit order, an expiration option, an immediate order, cancel order, a trailing stop order, a one cancels other order, and a conditional order;

allowing the market participant to choose to be identified or to remain anonymous with each trading order message;

allowing the market participant to select other market participants with whom he is willing to trade;

creating a match mask that indicates the selected other market participants a market participant is willing to trade with;

applying said match mask to the received trading order message, wherein the match mask is one or more of: a numerical identifier, an alphanumeric identifier, an identifier comprised of letters, a coded identifier, an encrypted identifier, a confidential identifier, a matrix, a table, a map, a chart, and an identifier consisting of ones and zeros;

receiving, at an order gateway server, trading order messages and associated match mask messages of market participants, wherein the order gateway server is configured to check the trading order messages for consistency with rules and logs and, once the trading order messages are found consistent, is further configured to forward the trading order messages along with their associated match mask to a matching engine server where the messages become a part of a market data feed;

filtering, by the matching engine server, of the market data feed based on the buy or sell indicator and the rate included in the trading order messages;

matching, by the matching engine server, of the match masks associated with a trading order message, to determine whether buyers and sellers are willing to trade;

identifying if the trading order messages contain a last look indicator, sending trade execution reports to market participants, wherein if a last look indicator is included in a trading order message, the execution report alerts a market participant requesting the last look that final approval is required prior to final trade execution;

completing a trade.

11. The method of claim 10, wherein the matching of the match masks by the matching engine server is performed by an algorithm found in executable code located on a secure server.

12. The method of claim 10, wherein the match mask message is a default match mask message utilized by said market participant, wherein the default match mask message contains client identifiers of preferred trading counter parties.

13. The method of claim 10, wherein the match mask message is a customized mask message, wherein the customized mask message is created for a trade and allows the market participant to send differentiated pricing to certain specified market participants.

14. The method of claim 10, wherein the market data message received comprises an execution report wherein the execution report message is sent to a participant who has indicated last look within their trading order message.

15. The method of claim 10, further comprising: generating, for use in a display, information indicating all consummated trades associated with the client identifier of said market participant, wherein the information further aids the market participant in analyzing client flow and performance of their market makers.

16. The method of claim 10, further comprising:
isolating completed trades by client identification;
generating, for use in a display, information indicating completed trades over the entire system for a specified time period; and
making accessible to each market participant said information upon request, wherein each market participant can view the marketplace as a whole by accessing completed trades within a given time period.

17. A computer readable medium upon which is embedded instructions for carrying out a method for anonymous and selective matching and filtering of customer orders using a network market system, the method comprising:
receiving, from one or more servers on a network, trading order messages created by market participants, wherein each trading order message is associated with one market participant creating said message and contains one or more indicators, the indicators identifying at least whether the market participant is a buyer or a seller, a price or rate, and a match mask containing client identifier information associated with other market participants;
comparing said trading order messages, in real-time, and identifying trading order messages based on the buy or sell indicators and the price or rate included in said messages, wherein the identified messages have buy rates equivalent to or greater than the sell rates;
matching the identified messages by locating two or more trading order messages having corresponding client identifiers in their match masks;
generating one or more market data messages, wherein a market data message indicates whether a trading order was matched, an amount, and the client identifiers of the market participants involved in the matched trading order;
distributing, for use in a display, the one or more market data messages; and
sending the one or more market data messages to one or more trade repositories to be stored for future access by one or more interconnected computing devices located on said network.

18. The method of claim 17, wherein the match masks are binary and the matching is performed by a binary analysis of whether a client identification is present.

19. The system of claim 17 wherein the one market participant creating the message is associated with a client identification that is anonymous.

20. The method of claim 17, wherein the market data message generated comprises an execution report, wherein the execution report message is sent to a participant who has indicated last look within their trading order message, wherein the method further includes initiating a countdown timer equal to the interval specified in the last look order.

* * * * *